US007391891B2

(12) United States Patent
Hillhouse

(10) Patent No.: US 7,391,891 B2
(45) Date of Patent: Jun. 24, 2008

(54) METHOD AND APPARATUS FOR SUPPORTING A BIOMETRIC REGISTRATION PERFORMED ON AN AUTHENTICATION SERVER

(75) Inventor: Robert D. Hillhouse, Ottawa (CA)

(73) Assignee: Activcard Ireland Limited, Dublin (IE)

( * ) Notice: Subject to any disclaimer, the term of this patent is extended or adjusted under 35 U.S.C. 154(b) by 0 days.

(21) Appl. No.: 11/514,797

(22) Filed: Aug. 31, 2006

(65) Prior Publication Data

US 2007/0110288 A1 May 17, 2007

Related U.S. Application Data

(62) Division of application No. 10/189,526, filed on Jul. 8, 2002.

(51) Int. Cl.
*G06K 9/00* (2006.01)
*H04K 1/00* (2006.01)

(52) U.S. Cl. .................. 382/124; 713/186; 340/5.53

(58) Field of Classification Search ......... 382/115–127; 340/5.1, 5.2, 5.52, 5.53; 902/3; 356/71; 713/186

See application file for complete search history.

(56) References Cited

U.S. PATENT DOCUMENTS

| 5,513,272 | A | 4/1996 | Bogosian, Jr. ............... 382/116 |
|---|---|---|---|
| 5,920,640 | A | 7/1999 | Salatino et al. ............. 382/124 |
| 6,011,858 | A | 1/2000 | Stock et al. .................. 382/115 |
| 6,016,476 | A | 1/2000 | Maes et al. ..................... 705/1 |
| 6,185,316 | B1 * | 2/2001 | Buffam ....................... 382/115 |
| 6,219,439 | B1 | 4/2001 | Burger ........................ 382/115 |
| 6,282,302 | B1 | 8/2001 | Hara ........................... 382/116 |
| 6,546,122 | B1 * | 4/2003 | Russo ........................ 382/125 |
| 6,719,200 | B1 | 4/2004 | Wiebe ......................... 235/382 |
| 2001/0031075 | A1 * | 10/2001 | Fujii ........................... 382/125 |
| 2003/0223624 | A1 * | 12/2003 | Hamid ........................ 382/124 |
| 2004/0034783 | A1 * | 2/2004 | Fedronic et al. ............. 713/186 |
| 2004/0042642 | A1 | 3/2004 | Bolle et al. .................. 382/115 |
| 2004/0052405 | A1 | 3/2004 | Walfridsson ................ 382/115 |
| 2004/0175023 | A1 | 9/2004 | Svedin et al. ............... 382/124 |
| 2004/0215615 | A1 | 10/2004 | Larsson et al. ................. 707/9 |
| 2004/0252868 | A1 * | 12/2004 | Nilsson ....................... 382/124 |
| 2005/0152584 | A1 * | 7/2005 | Svedin ........................ 382/124 |

FOREIGN PATENT DOCUMENTS

| EP | 0 680 004 | 11/1995 |
|---|---|---|
| EP | 1 385 118 | 1/2004 |
| WO | WO 01/11577 | 2/2001 |
| WO | WO 01/84494 | 11/2001 |
| WO | WO 01/90962 | 11/2001 |
| WO | WO 01/99042 | 12/2001 |
| WO | WO 03/003286 | 1/2003 |

* cited by examiner

*Primary Examiner*—Aaron W Carter
(74) *Attorney, Agent, or Firm*—Perkins Coie LLP

(57) ABSTRACT

A method for matching biometric data on an authentication server is disclosed. An authentication server is provided having biometric template data stored thereon. A plurality of workstation processors in communication with the authentication server is also provided. A sensed biometric image is provided to a processor out of the plurality of workstation processors from an individual. From the authentication server to the processor, co-ordinate data relating to a plurality of non-contiguous features of the template data are provided. Characteristic data is extracted from the biometric image, the characteristic data for correlation with the provided co-ordinate data allowing for a subsequent alignment of the biometric image within a known frame of reference relative to the template data on the basis of the provided data and the other data. Once aligned, biometric data is extracted from the biometric image, the biometric data within the known frame of reference, and the extracted biometric data is transmitted to the authentication server.

20 Claims, 13 Drawing Sheets

| Feature | X-loc | Y-loc | Orientation | Type |
|---|---|---|---|---|
| Core | 0 | 0 | 0 | whirl |
| Minutia | 4 | 4 | 34 | 2 |
| Minutia | -4 | -1 | 306 | 1 |
| Minutia | 1 | -4 | 270 | 1 |
| Minutia | 12 | -1 | 165 | 2 |
| Minutia | -14 | 4 | 12 | 2 |
| Minutia | 34 | -40 | 287 | 1 |
| Minutia | 6 | 32 | 73 | 2 |
| Minutia | -3 | -44 | 102 | 2 |
| Minutia | 18 | -22 | 56 | 1 |
| Minutia | 12 | -1 | 156 | 1 |
| Minutia | -26 | 9 | 43 | 2 |
| Minutia | 22 | -28 | 298 | 1 |

Fig. 4

METHOD AND APPARATUS FOR SUPPORTING A BIOMETRIC REGISTRATION PERFORMED ON AN AUTHENTICATION SERVER

CROSS-REFERENCE TO RELATED APPLICATIONS

The present patent application is a divisional application of U.S. patent application Ser. No. 10/189,526, filed on Jul. 8, 2002. The contents of that application are hereby incorporated by reference.

FIELD OF THE INVENTION

The invention relates to a method of identifying an individual by comparing biometric information of the individual with reference data that is stored on an authentication server, and more particularly to a method of identifying an individual in which the comparison is performed on a processor of the authentication server.

BACKGROUND OF THE INVENTION

Magnetic strip cards have been widely used for controlling access by individuals to information, rooms and financial transaction instruments. Typically, the individual must "swipe" the card through a magnetic strip reader and provide a personal identification number (PIN) in order to be identified as an authorized user of the card. This system suffers from several disadvantages, including the tendency of individuals to forget an assigned PIN number, or to seriously compromise the security of an assigned PIN number by writing it down in close proximity to the card. Similarly, individuals have a tendency to select PIN numbers that are easily remembered and that often have a personal significance, such as a birth date, which PIN numbers are easily guessed by an unauthorized individual. Accordingly, magnetic strip cards are convenient, but do not provide a high level of security.

In order to provide increased control, security, and fault tolerance, many organizations implement their security access functionality on a server. Thus, each time an individual authenticates within a network environment, the individual provides authentication data that is then transmitted to the server securely for authentication thereby. In this fashion, security data is not transmitted from the server and the maintenance and fault tolerance of the system relies on a single computer, which can be maintained at intervals and can be backed up. When used with passwords of 8 characters each, a server must receive 8 characters, retrieve 8 characters and compare the two sets of 8 characters. Then the result is transmitted to the workstation to one of authenticate, identify, and neither authenticate nor identify the individual. Thus for each authentication process approximately 25 operations are performed. For a 1 GHz processor, this allows up to 10 million users for a network specification allowing a delay up to 0.25 second. This is more than enough for nearly all applications.

When the same server is used with a biometric identification process, the server receives considerably more data. For example, for a fingerprint an image having 250,000 pixels is provided. If the pixels have a depth of 1 bit, this results in about 30 KB of data. This data must be received in a secure fashion, decoded, analyzed to extract a core thereof, analyzed to extract features relative to the core, and then the features are analyzed to extract data relating thereto. The extracted data is then compared to stored template data to determine a likelihood of an accurate match. Such a process may take 0.1 seconds or more. Unfortunately, as organizations grow, the single security server approach to biometric identification becomes limiting. When 36,000 workstations are coupled to a single server the maximum delay is approximately one hour. Even for 3,600 workstations, the maximum delay is 6 minutes—far above the 0.25 sec specification set out above. Thus, there is a need for more flexible verification techniques to support centralized management and performance requirements of larger organizations.

One technique to enhance performance while maintaining the centralized server architecture is to add security processors to the network. Unfortunately, even if the biometric identification process was limited to 0.01 seconds, to meet the 0.25 second requirement allows only 25 users per server. This is both costly and presents a management problem in managing a large number of servers. It is highly advantageous to have a single server solution to reduce back-up and redundancy costs and to facilitate management of the server.

It is therefore an object of the instant invention to provide a method of identifying an individual for execution on a server for serving many workstations that overcomes some of the limitations of the prior art.

SUMMARY OF THE INVENTION

In accordance with the instant invention, there is provided a method for matching biometric sensed data on a first processor, the first processor being in contact with a first memory and an identification system, the identification system comprising a biometric imaging device for sensing a biometric image, a second memory and a workstation processor. The method includes the steps of storing biometric template data on the authentication server, sensing a biometric image with the biometric imaging device, providing a sensed biometric image to the workstation processor, providing feature data relating to a plurality of features of the template data from the authentication server to the workstation processor, extracting characteristic data from the sensed biometric image, the characteristic data for correlation with the provided co-ordinate data, aligning the sensed biometric image within a known frame of reference relative to the template data on the basis of the provided co-ordinate data and the extracted characteristic data, extracting biometric sensed data from the sensed biometric image, the biometric sensed data within a known frame of reference, and providing the biometric sensed data to the first processor.

In accordance with the instant invention, there is also provided a method for registering biometric data with a template on a first processor, the processor being in contact with a first memory and a at least one other processor, the method including the steps of, providing alignment data including co-ordinates for transmission from the authentication server, the alignment data for use by the at least one other processor in aligning sensed biometric data within a known frame of reference, receiving biometric data aligned within the known frame of reference, the biometric data received from other than within the authentication server, and correlating the received biometric data with template data stored within the authentication server, the correlating performed within the authentication server to produce a correlation result.

In accordance with the instant invention, there is further provided a method for registering biometric data on another processor having a plurality of templates stored thereon, the method including the steps of selecting a template out of the plurality of templates, sensing a biometric source to provide biometric data, receiving alignment data relating to the template, including co-ordinates from the authentication server, the alignment data for use in aligning sensed biometric data within a known frame of reference, aligning the sensed biometric image data within the known frame of reference, determining from the aligned biometric image data biometric data, and providing the biometric data based on the aligned biometric image data and within the known frame of reference.

According to another aspect of the instant invention, provided is a biometric identification system comprising a at least one first memory, a at least one first transceiver, a at least one biometric sensor for sensing an image of a biometric information source and for providing sensed biometric image data, and a at least one first processor in operative communication with the at least one first transceiver. The at least one first processor is for executing the steps of, receiving sensed biometric image data from the biometric sensor, receiving alignment data including co-ordinates from the at least one first transceiver, the alignment data for use by the processor in aligning the sensed biometric image data within a known frame of reference, aligning the sensed biometric image data within the known frame of reference, determining from the aligned biometric image data extracted biometric data, and providing the extracted biometric data based on the aligned biometric image data and within the known frame of reference to the at least one first transceiver. The biometric identification system further comprises a second memory for storing biometric template data, a second transceiver in communication with the at least one first transceiver for transmitting data thereto and for receiving data therefrom, and a second processor in operative communication with the second transceiver, the second processor for performing the steps of providing alignment data including co-ordinates to the second transceiver for transmission to the at least one first transceiver, the alignment data for use by the at least first processor in aligning sensed biometric data within a known frame of reference, receiving the extracted biometric data aligned within the known frame of reference, and correlating the received biometric data with template data stored within the second memory.

According to yet another aspect of the instant invention, provided is an authentication server for performing biometric identification thereon, the authentication server comprising a transceiver for transmitting data from the authentication server and for receiving data provided to the authentication server, a processor, and a memory for storing template data relating to a biometric image and for storing data relating to instructions for execution by the processor, the instructions comprising instructions for performing the steps of providing alignment data including co-ordinates to the transceiver for transmission from the authentication server, the alignment data for use by at least one other processor in aligning sensed biometric data within a known frame of reference, receiving biometric data aligned within the known frame of reference, the biometric data received from other than within the authentication server, and correlating the received biometric data with template data stored within the memory, the correlating performed within the authentication server. The instructions further include performing one of identifying and authorizing an individual in dependence upon the step of correlating.

In accordance with another aspect of the instant invention, there is also provided a biometric imaging station for use with an authentication server in performing biometric identification on the authentication server, the biometric imaging station comprising a biometric sensor for sensing an image of a biometric information source to provide sensed biometric image data, a transceiver for transmitting data to the authentication server and for receiving data provided from the authentication server, a memory for storing data, and a processor for performing the steps of receiving alignment data including co-ordinates from the transceiver from authentication server, the alignment data for use by the processor in aligning the sensed biometric data within a known frame of reference, aligning the sensed biometric image data within the known frame of reference, determining from the aligned biometric image data extracted biometric data, and providing the extracted biometric data based on the aligned biometric image data and within the known frame of reference to the authentication server.

In accordance with the instant invention, there is also provided a storage medium having data stored therein and relating to instructions for performing the steps of receiving alignment data including co-ordinates from a transceiver, the alignment data for use by a processor in aligning the sensed biometric data within a known frame of reference, aligning the sensed biometric image data within a known frame of reference, determining from the aligned biometric image data extracted biometric data, and providing the extracted biometric data based on the aligned biometric image data and within the known frame of reference.

In accordance with the instant invention, there too is provided an authentication server comprising a memory with a biometric template, which is intended to be compared with a biometric sample for identity check, wherein the biometric template is divided into a private part which is adapted to be used in the authentication server, and a public part which is adapted to be transferred to and used in a workstation processor.

BRIEF DESCRIPTION OF THE DRAWINGS

The invention will now be described with reference to the attached drawings in which:

FIG. 4 is a schematic representation of a biometric fingerprint template;

DETAILED DESCRIPTION OF THE INVENTION

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and the scope of the invention. Thus, the present invention is not intended to be limited to the embodiments disclosed, but is to be accorded the widest scope consistent with the principles and features disclosed herein. In particular, the invention is described with reference to fingerprints but it is to be completely understood that the invention also works with other forms of biometric information.

Figure 1:
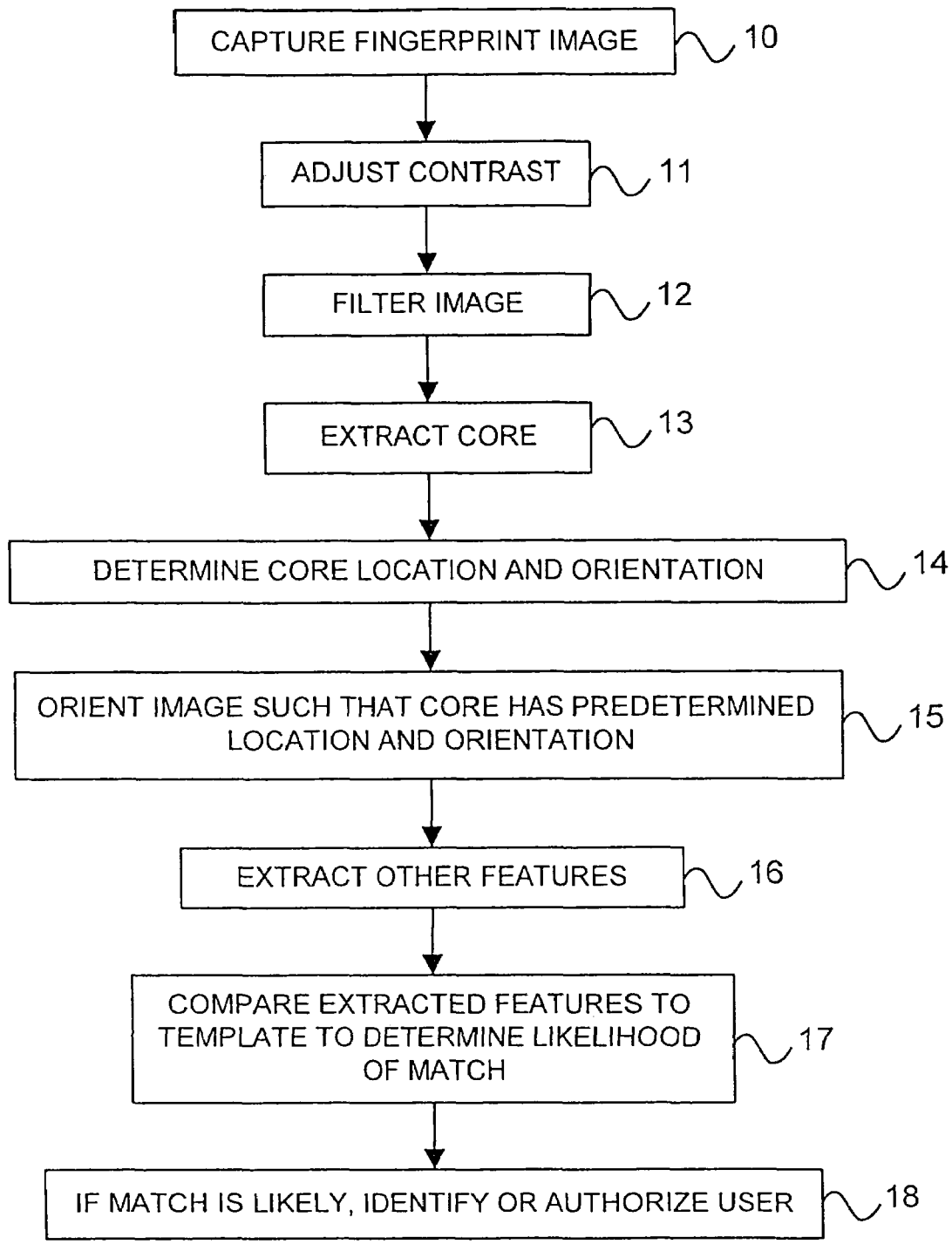
FIG. 1 is a simplified flow diagram of a prior art method of performing fingerprint identification.

Referring to FIG. 1, a prior art method of performing fingerprint identification is shown. A fingerprint is imaged in step 10. The image is then filtered using image processing filtering techniques in step 12 and the contrast is adjusted to a normalized level in step 11. Once pre-processing of the image is completed, the image is in a standardized form for analysis.

The image is then analyzed in step 13 to determine a core feature or features. This feature is used to align the image in space and orientation in step 14 in order to allow for more accurate correlation with template data. Once oriented in step 15, the image is analyzed and features are identified for use in correlation in step 16. The features are compared to features in a stored template to determine a likelihood of a match in step 17. When a match is likely, a user identification or authorization is performed in step 18.

Though capturing of biometric image data is not an exact process and, as such, variations in the captured image often occur, feature alignment is a very likely cause of registration inaccuracies and variations. Thus, two images that are of an identical biometric information source and that contain identical information offset one from another in translation and rotation may not register exactly one against another. This results from small differences in image alignment even once image orientation has occurred.

Much of the processing that occurs during the analysis of the fingerprint is related to re-orienting the fingerprint for easier correlation and to feature identification.

Figure 2:
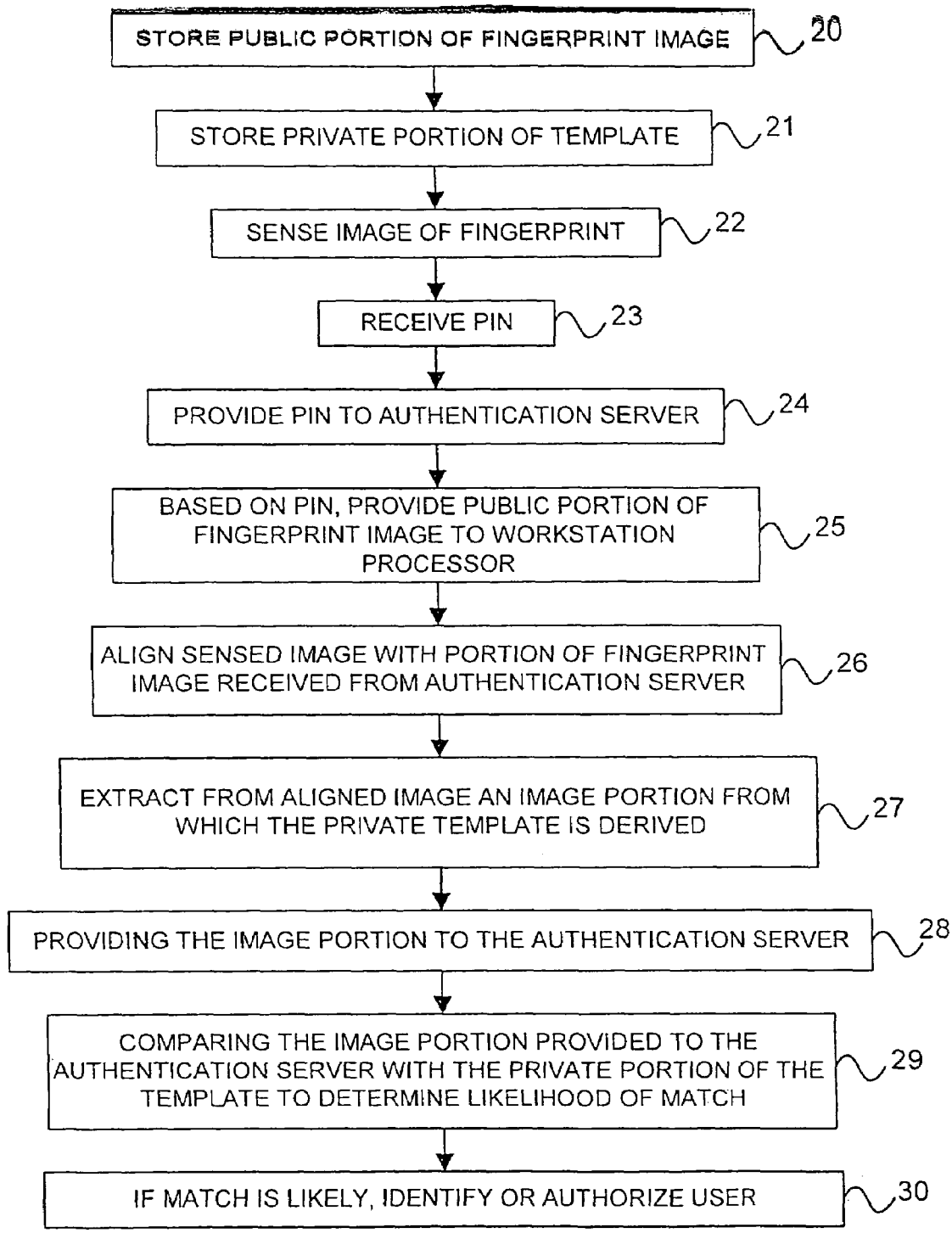
FIG. 2 is a simplified flow diagram of a method of preprocessing a fingerprint image.

Referring now to FIG. 2, shown is a method of preprocessing a fingerprint image wherein biometric data is provided to a preprocessor from a server in the form of a public portion of a template according to the invention.

For example, during a registration step (not shown), an authorized user of a workstation in communication with an authentication server provides a fingertip having a fingerprint to an imaging device that is in communication with the authentication server. The imaging device senses the topological features of the fingerprint and stores an image of the fingerprint template in memory of the authentication server. The memory includes a public access portion for storing a public portion of the fingerprint image in step 20 and a private access portion for storing a private portion of the fingerprint image in step 21.

When the authorized user of the workstation wishes to be identified or recognized, the same fingertip is provided to an imaging device in step 22 of a workstation in communication with the authentication server, the fingerprint is imaged and stored electronically in a memory of the workstation. The user provides a PIN to the workstation in step 23 and the PIN is provided from the workstation to the authentication server in step 24. In dependence upon the PIN being verified, the authentication server provides the public portion of the fingerprint image to a processor of the workstation in step 25. The workstation processor aligns the sensed fingerprint image with the public portion of the fingerprint image that was provided from the authentication server in step 26. The workstation processor then extracts from the aligned image an image portion from which the private template is derived in step 27. The image portion is provided to the authentication server in step 28, where the authentication server processor compares the image portion with the private portion of the template to determine a likelihood of a match in step 29. If a match is likely, the user is identified or recognized in step 30. If a match is other than likely, then the authorization attempt is rejected and the user is denied access. In either case, the determination is transmitted to the workstation.

The relevant information for the alignment process is contained in the public portion or in an area of the biometric template relating to the public portion, and the alignment information comprises individual specific parameters, parameters relating to image rotation, mutual positioning of a plurality of features of a predetermined type, and the like.

Figure 3:
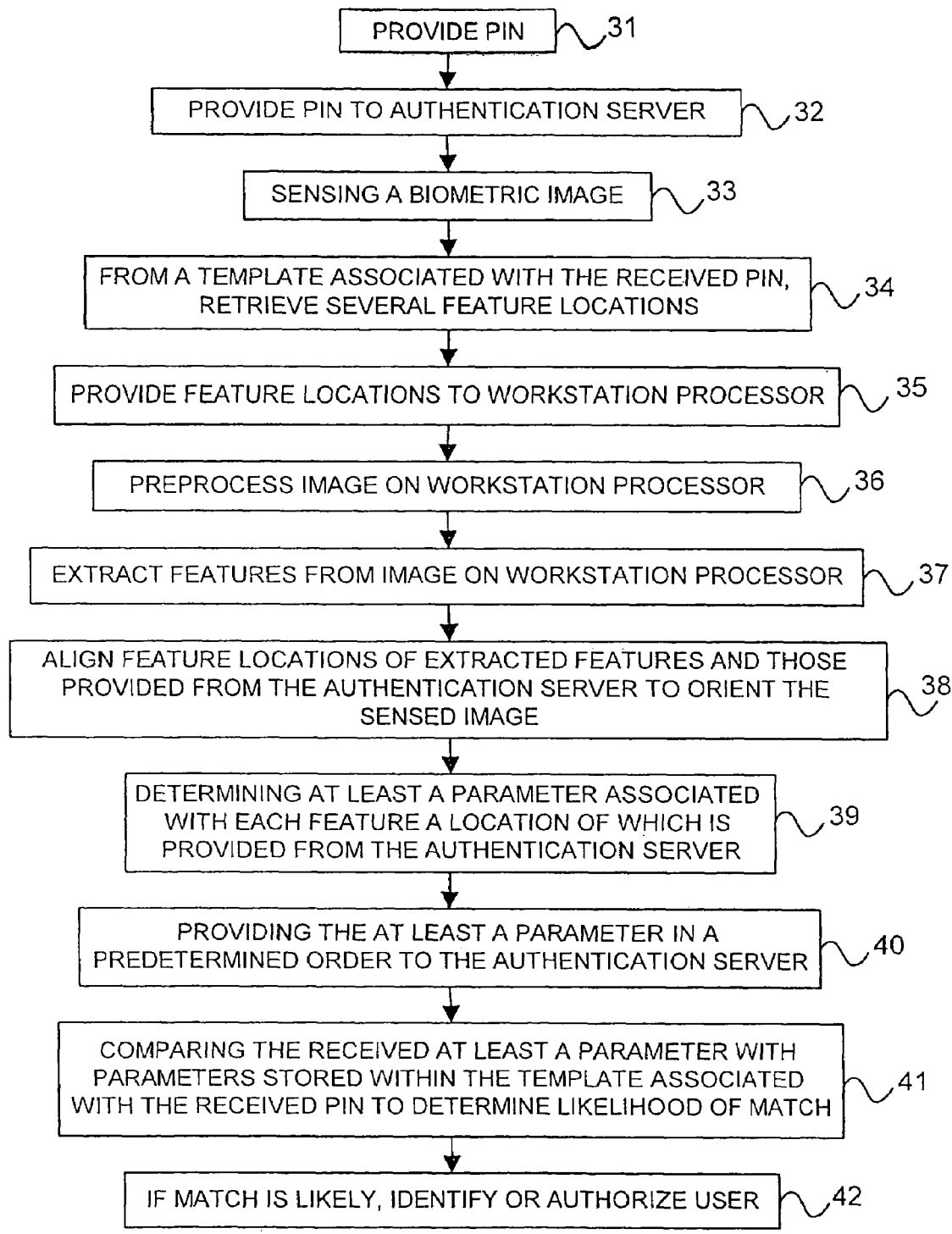
FIG. 3 is a simplified flow diagram of a method of preprocessing a fingerprint image according to another embodiment of the instant invention.

Referring now to FIG. 3, a method of preprocessing a fingerprint image is shown, wherein biometric data is not provided to a preprocessor, for instance a processor of a workstation, from the authentication server. Instead, according to the instant invention, an authentication server is used to store a plurality of biometric template images and related template information. As such, the process is alterable without suffering the drawbacks of the prior art methods. Further, as noted above, when fingerprint image data is provided from the authentication server, this reduces the security of the fingerprint registration system since correlation data is determinable from the data received from the authentication server. A preprocessing of the data before identification is still an integrated step in the present invention. Although a processor of the authentication server is sufficiently powerful to process a single fingerprint image, when many fingerprint processing requests are received simultaneously, it has insufficient resources to provide desired levels of performance. When that data are pre-processed on a workstation, the authentication server is able to deal with a substantially larger number of approximately simultaneous identification requests.

The user provides in step 31 a PIN to a workstation in communication with the authentication server, and the workstation provides the PIN to the authentication server in step 32. The PIN is used to select a user-specific template out of the plurality of templates stored on the authentication server. Next, a fingerprint image of the user is captured using an imaging device of the workstation in step 33. The image is filtered and the contrast is adjusted to a normalized level. The fingerprint image is then analyzed by the workstation processor to determine features thereof. Typically features of fingerprints include ridge flow angle, minutia locations, minutia types, minutia directions, core location, core orientation, and so forth. Of course, in order for any of the features to have meaning, they all must be related to a global position or a position independent frame of reference; this global position and orientation is often related to the core location and orientation.

Thus, a typical biometric fingerprint template appears as shown in the diagram of FIG. 4. Of course, other data formats and orders are possible. Further, it is possible to store the data in any form that allows extraction of the same information therefrom. For example, each minutia may be stored relative to a previous minutia without changing the information content of the template.

As is evident from FIG. 4, the core is arbitrarily assigned the coordinate (0,0). The core orientation is assumed to be in the Y direction. The minutiae are listed in order of distance from the core. About the core the minutiae are denser than at a distance therefrom. The template of FIG. 4 has 24 minutiae listed. Though this is the case, often fingerprint analysis and recognition systems use far fewer minutiae to perform an identification process.

Each minutia has a location expressed as a coordinate, has a direction expressed as an angle or as a slope, and has a type expressed in the template shown by a numeric identifier, each number indicative of a particular predetermined minutia type.

There is also an identifier indicating the fingerprint type, and the ridge flow angle at several locations. Of course other features are also known and could be extracted from a fingerprint image and stored within the template for later identification.

Thus, as noted with reference to FIG. 1, the main processing tasks in biometric registration include, image processing to filter the image and, when necessary, scale and normalize the image; global feature identification; image rotation and translation relative to the global feature; feature extraction from the image; feature analysis and identification; feature correlation with template features. Of course when the template is an image, the step of feature analysis and identification is unnecessary and the step of correlation is more complex or less reliable.

Of the steps outlined above, feature correlation is the least processor intensive while global feature identification, image rotation, and feature extraction are the most processor intensive. That said, these are the processes that are typically performed by the correlating processor since only that processor has available thereto the data necessary for performing such a correlation.

Returning to FIG. 3, the method provides for provision of challenge data relating to a template, the data other than image data of a biometric information source. For instance, in step 34 the authentication server retrieves from memory a stored template that is associated with the received PIN, and retrieves a plurality of feature locations from the template. Of course, the feature locations need not be stored within the template. The plurality of locations is of identifiable features, preferably features having accurately identifiable locations.

A processor of the workstation receiving in step 35 the challenge and an image of a biometric information source then uses the challenge data to orient the image of the biometric information source relative thereto in step 36. This is performed by identifying features within the image in step 37, determining feature locations in step 38, and then moving the feature locations to overlap the provided locations in step 39 until a reasonable approximation of image positioning is achieved.

Once the image positioning is achieved, data relating to a plurality of features within the image are provided to the authentication server for correlation in step 40. For example, the data relates to minutia locations and directions of the 12 minutiae nearest the first point provided.

Thus the processor of the authentication server need only compare a plurality of values to values within the template stored thereon in step 41 in order to form a registration measure for use in user authorization. Preferably, the comparison is not a fixed comparison to allow for missed minutiae or extra minutiae within a template. If a match is likely, the user is identified or recognized in step 42. If a match is other than likely, then the authorization attempt is rejected and the user is denied access.

Since feature locations are provided from the authentication server for aligning the image, it is possible to provide features at a significant distance one from another. As is known to those of skill in the art of image processing, the longer the distance between two points to be aligned, the more accurate the rotational alignment. Of course a third point is needed to differentiate between 180° rotations. Thus, by selecting feature locations at a distance one from another, the alignment accuracy is improved relative to alignment of image data based on a single feature—core—and its orientation.

Figure 5:
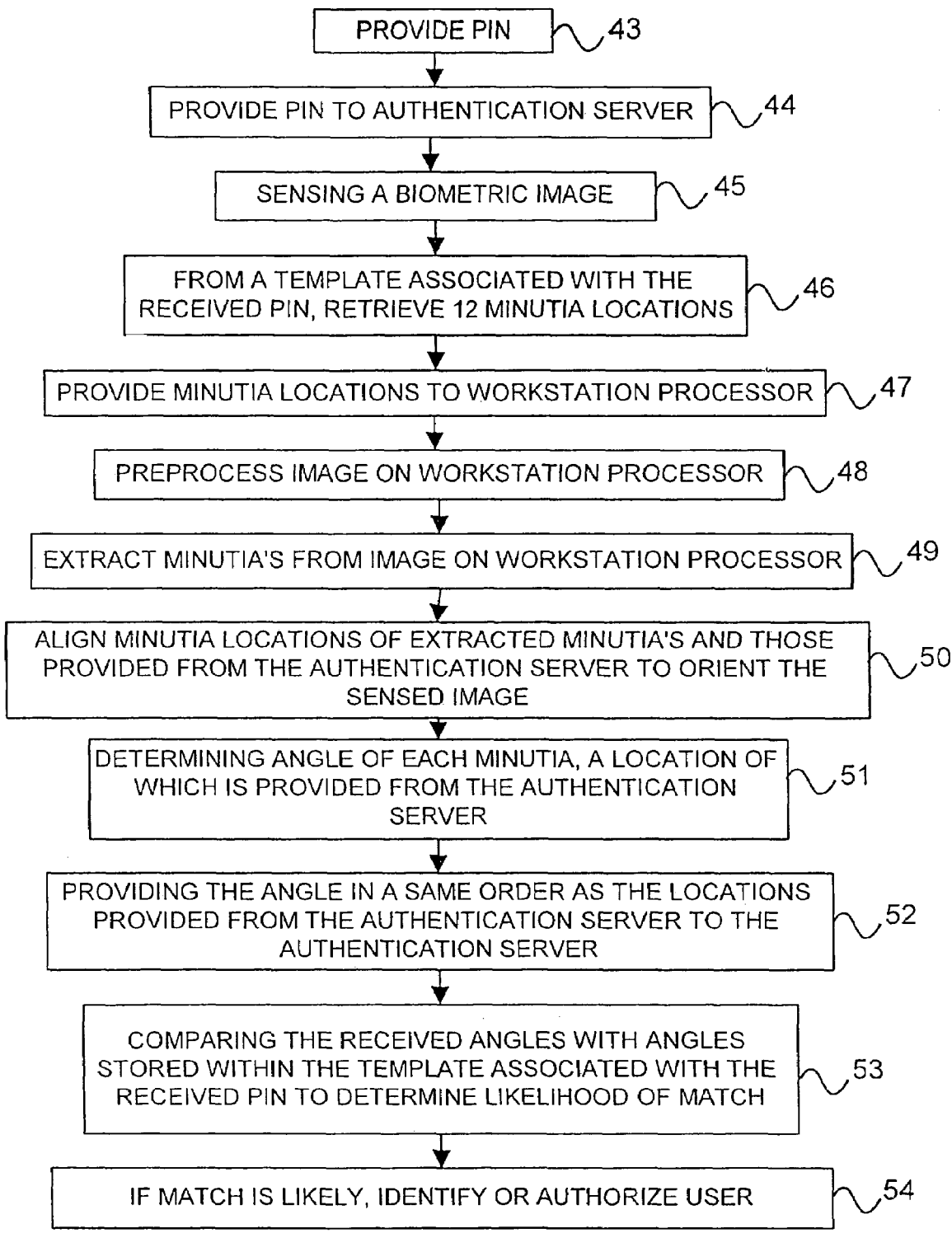
FIG. 5 is a simplified flow diagram of a method of preprocessing a fingerprint image according to another embodiment of the instant invention.

Referring to FIG. 5, a more specific embodiment of the method of FIG. 3 is shown. The user provides in step 43 a PIN to a workstation in communication with the authentication server, and the workstation provides the PIN to the authentication server in step 44. The PIN is used to select a user-specific template out of the plurality of templates stored on the authentication server. Next, a fingerprint image of the user is captured using an imaging device of the workstation in step 45. The authentication server retrieves 12 minutia locations from a stored template, which template is associated with the provided PIN in step 46. Of course any number of minutia locations are optionally provided. The 12 minutiae locations are provided from the authentication server to the processor of the workstation in step 47. It is evident to those of skill in the art that from a plurality of minutia locations, little or nothing is determinable about the minutia types or directions. Further, little or nothing is determinable about the fingerprint such as type, ridge flow angles, core location—since there are insufficient minutiae to accurately identify the denser cluster about the core—and so forth. As such, the minutiae locations themselves are insufficient to provide information for statistical estimation of image features.

The captured fingerprint is filtered and the contrast is adjusted to a normalized level in step 48. The image is then analyzed by the workstation processor to determine features thereof, and minutiae locations are extracted in step 49. The workstation processor with the 12 minutiae locations provided from the authentication server, in order to spatially and rotationally orient the image in step 50, then aligns the captured fingerprint image. Once completed, the processed image is located in direct correlation to the template data. Advantageously, such a process obviates a need for core identification, extraction, and orientation.

The processed image is then analyzed by the workstation processor to extract data relating to each minutia provided in step 51. For each minutia extracted, a minutia direction, for instance an angle, is returned as is a minutia type. The workstation processor provides the angles and types to the authentication server, in a same order as the locations were provided from the authentication server to the workstation processor in step 52. The authentication server processor then compares the angle returned for each minutia to an angle stored within the template data and the minutia types to known minutia types stored within the template to determine if a match between the captured fingerprint image and the template data is likely in step 53. If a match is likely, the user is identified or recognized in step 54. If a match is other than likely, then the authorization attempt is rejected and the user is denied access.

Of note, when the angle is provided with 12° increments and there are 8 minutiae types, only one byte of data is provided to the authentication server for each minutia. Thus, in the above example only 12 bytes are provided thus minimizing data transfer to the authentication server and correlation processing thereby. Also, the minutia direction is correlatable to a grid angle allowing for storage of minutia with only a few bits.

Figure 6:
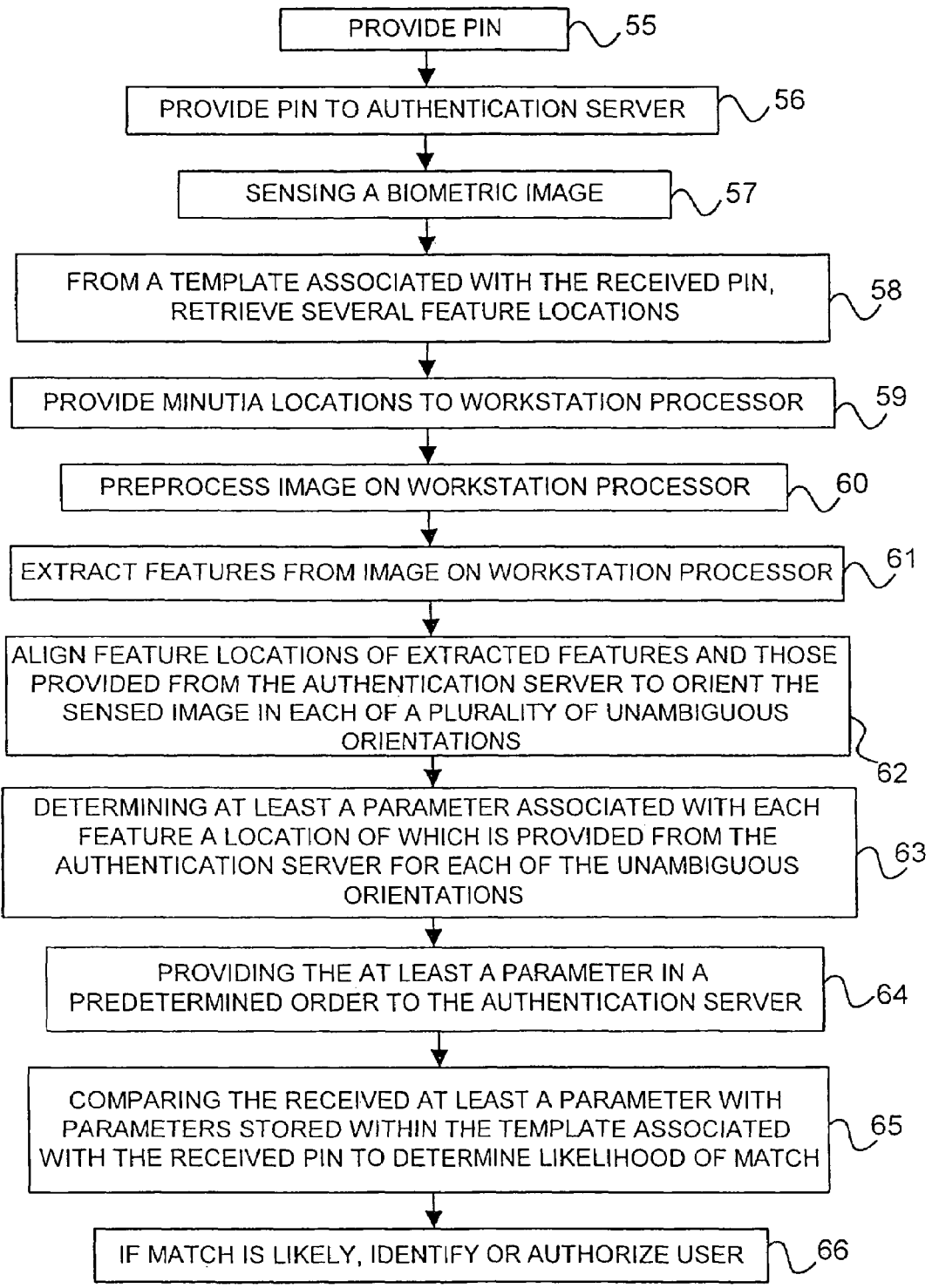
FIG. 6 is a simplified flow diagram of a method of preprocessing a fingerprint image according to another embodiment of the instant invention.

Referring now to FIG. 6, a method of preprocessing a fingerprint image according to the instant invention is shown, wherein biometric data in the form of a public portion of a template is not provided to a preprocessor, for instance a processor of a workstation, from the authentication server. As such, the process is alterable without suffering the drawbacks of the prior art methods.

The user provides in step 55 a PIN to a workstation in communication with the authentication server, and the workstation provides the PIN to the authentication server in step 56. The PIN is used to select a user-specific template out of the plurality of templates stored on the authentication server. Next, a fingerprint image of the user is captured using an imaging, device of the workstation in step 57. The image is filtered and the contrast is adjusted to a normalized level. The fingerprint image is then analyzed by the workstation processor to determine features thereof. Typically features of fingerprints include ridge flow angle, minutia locations, minutia types, minutia directions, core location, core orientation, and so forth. Of course, in order for any of the features to have meaning, they all must be related to a global position; this global position and orientation is often related to the core location and orientation.

The method of FIG. 6 provides for provision of challenge data relating to a template, the data other than image data of a biometric information source. For instance, the authentication server retrieves from memory a stored template that is associated with the received PIN, and retrieves a plurality of feature locations from the template in step 58. The plurality of locations is of identifiable features, preferably features having accurately identifiable locations.

Figure 6A:
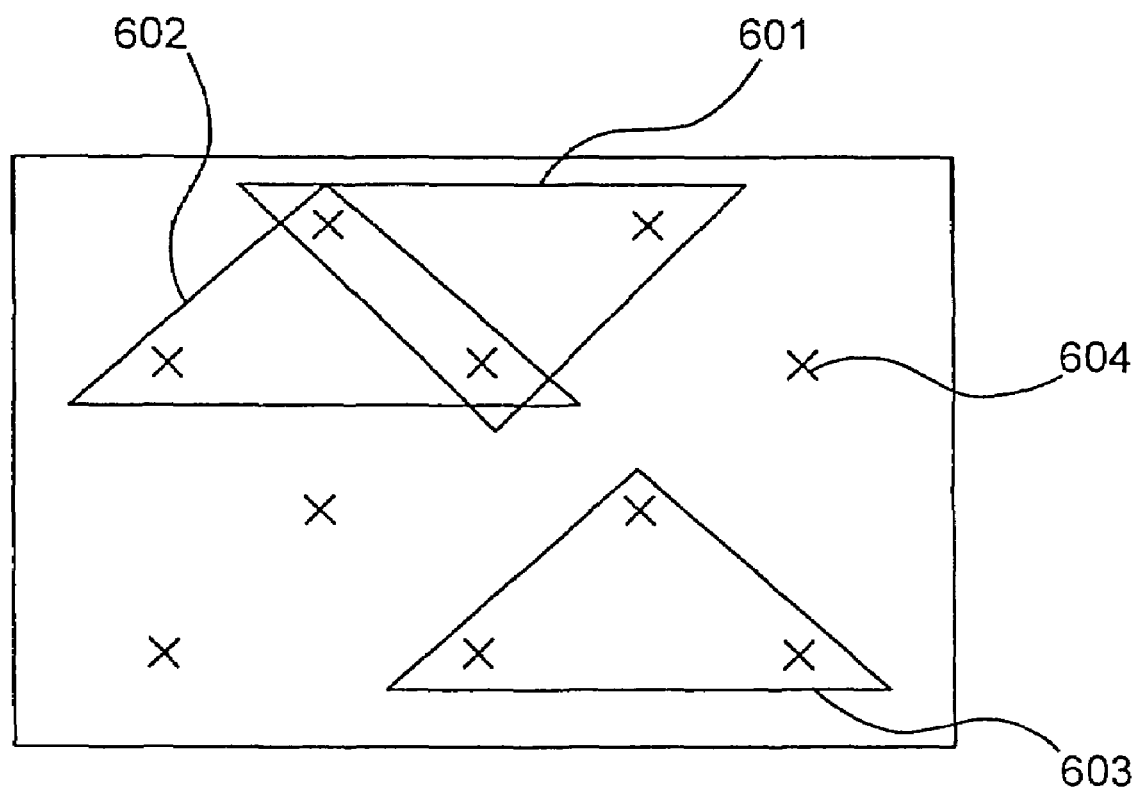
FIG. 6a is an example of three feature locations allowing for three orientations of an image.

A processor of the workstation receiving in step 59 the challenge and an image of a biometric information source then uses the challenge data to orient the biometric information source in step 60 relative thereto in each of a plurality of unambiguous orientations. This is performed by identifying features within the image in step 61, determining feature locations in step 62, and then moving the feature locations to overlap the provided locations until a reasonable approximation of image positioning is achieved for each of the unambiguous orientations in step 63. For example, three feature locations 601, 602 and 603 are provided which allows for, in this example, three orientations of the image of FIG. 6a. Thus, for each orientation, features 604 are differently positioned one relative to another. There are three unambiguous alignments though it is ambiguous which of the three is actually the intended alignment.

Once the image positioning is achieved, data relating to a plurality of features within the image for each one of the plurality of unambiguous orientations are provided to the authentication server in a predetermined order for correlation in step 64. For example, the data relates to minutia locations and directions of the 12 minutiae nearest the first point provided. Alternatively, the data may relate only to the features at the locations provided.

Optionally, only one of the data sets relating to a single alignment is used in the step of correlation.

Thus the processor of the authentication server need only compare a plurality of values to values within the template stored thereon in order to form a registration measure for use in user authorization in step 65. Preferably, the comparison is not a fixed comparison to allow for missed minutia or extra minutia within a template. Further preferably, the template accounts for differing orders of minutia in the above example due to inaccuracies in core locating that may occur. If a match is likely, the user is identified or recognized in step 66. If a match is other than likely, then the authorization attempt is rejected and the user is denied access.

Figure 7:
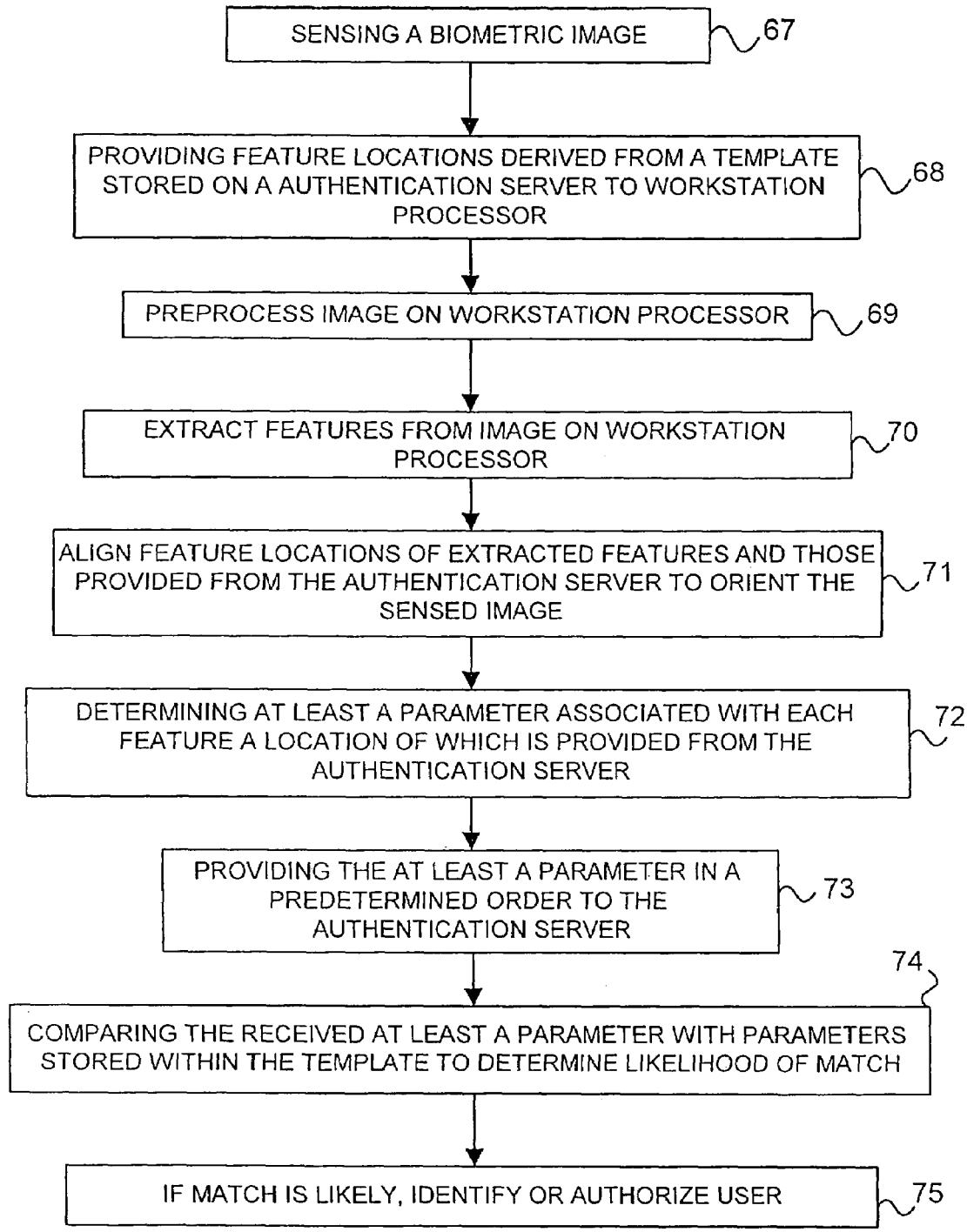
FIG. 7 is a simplified flow diagram of a method of preprocessing a fingerprint image according to another embodiment of the instant invention.

Referring now to FIG. 7, a method of preprocessing a fingerprint image according to the instant invention is shown, wherein biometric data in the form of a public portion of a template is not provided to a preprocessor, for instance a processor of a workstation, from an authentication server. As such, the process is alterable without suffering the drawbacks of the prior art methods.

A fingerprint image of the user is captured using an imaging device of the workstation in step 67. Features locations derived from a template stored on an authentication server are provided to the workstation processor in step 68. The image is filtered and the contrast is adjusted to a normalized level in step 69. The fingerprint image is then analyzed by the workstation processor to determine features thereof, in step 70. Typically features of fingerprints include ridge flow angle, minutia locations, minutia types, minutia directions, core location, core orientation, and so forth. Of course, in order for any of the features to have meaning, they all must be related to a global position; this global position and orientation is often related to the core location and orientation.

The method provides for provision of challenge data relating to a template, the data other than image data of a biometric information source. For instance, the authentication server retrieves from memory a stored template, and retrieves a plurality of feature locations from the template. The plurality of locations is of identifiable features, preferably features having accurately identifiable locations.

A processor of the workstation receiving the challenge and an image of a biometric information source then uses the challenge data to orient the biometric information source relative thereto in step 71. This is performed by identifying features within the image, determining feature locations, and then moving the feature locations to overlap the provided locations until a reasonable approximation of image positioning is achieved in step 72.

Once the image positioning is achieved, data relating to a plurality of features within the image are provided to the authentication server in a predetermined order for correlation in step 73. For example, the data relates to minutia locations and directions of the 12 minutiae nearest the first point provided.

Thus the processor of the authentication server need only compare a plurality of values to values within the template stored thereon in order to form a registration measure for use in user authorization in step 74. Preferably, the comparison is not a fixed comparison to allow for missed minutia or extra minutia within a template. Further preferably, the template accounts for differing orders of minutia in the above example due to inaccuracies in core locating that may occur. If a match is likely, the user is identified or recognized in step 75. If a match is other than likely, then the authorization attempt is rejected and the user is denied access.

Figure 8:
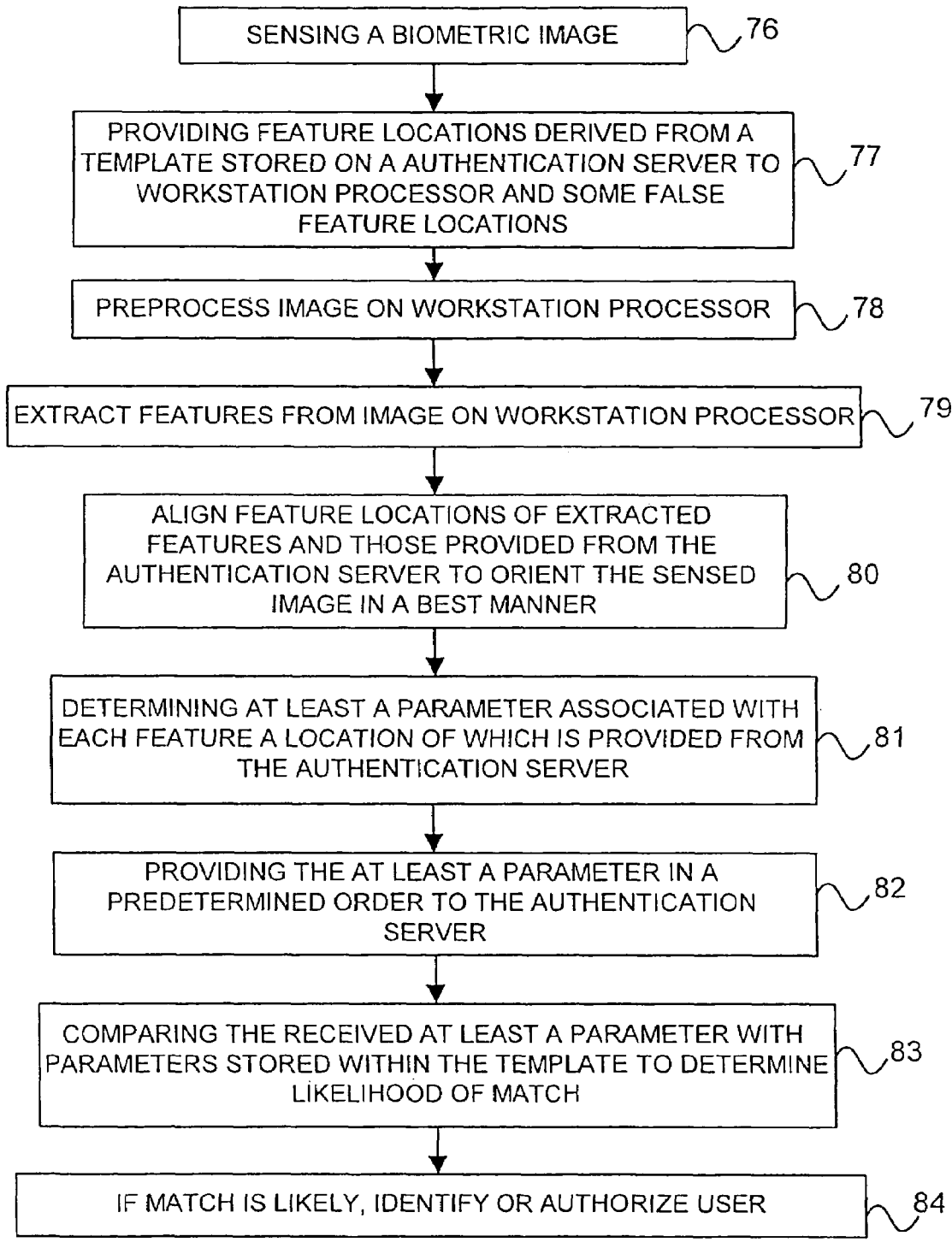
FIG. 8 is a simplified flow diagram of a method of preprocessing a fingerprint image according to another embodiment of the instant invention.

Referring now to FIG. 8 a method of preprocessing a fingerprint image according to the instant invention is shown, wherein biometric data in the form of a public portion of a template is not provided to a preprocessor, for instance a processor of a workstation, from the authentication server. As such, the process is alterable without suffering the drawbacks of the prior art methods.

A fingerprint image of the user is captured using an imaging device of the workstation in step 76. Feature locations derived from a template stored on an authentication server and some false feature locations are provided to the workstation processor in step 77. The image is filtered and the contrast is adjusted to a normalized level in step 78. The fingerprint image is then analyzed by the workstation processor to determine features thereof in step 79. Typically features of fingerprints include ridge flow angle, minutia locations, minutia types, minutia directions, core location, core orientation, and so forth. Of course, in order for any of the feature locations to have meaning, they all must be expressed within a global reference frame; this global reference frame includes position and orientation is often related to the core location and orientation.

The method provides for provision of challenge data relating to a template, the data other than image data of a biometric information source. For instance, the authentication server retrieves from memory a stored template, and retrieves a plurality of feature locations from the template. The plurality of locations is of identifiable features, preferably features having accurately identifiable locations. According to the method of FIG. 8, the authentication server further provides at least a false feature location, for instance a location that does not correspond to a location of a minutia point.

A processor of the workstation receiving the challenge and an image of a biometric information source then uses the challenge data to orient the biometric information source relative thereto and in a best manner in step 80. This is performed by identifying features within the image, determining feature locations, and then moving the feature locations to overlap the provided locations until a reasonable approximation of image positioning is achieved in step 81.

Once the image positioning is achieved, data relating to a plurality of features within the image are provided to the authentication server in a predetermined order for correlation in step 82. For example, the data relates to minutia directions and types for the feature locations provided. Of course, when the feature location is a false feature location, no such data is determinable. As such, even less information relating to the fingerprint data is provided.

Thus the processor of the authentication server need only compare a plurality of values to values within the template stored thereon in order to form a registration measure for use in user authorization in step 83. Preferably, the comparison is not a fixed comparison to allow for missed minutia or extra minutia within a template. Further preferably, the template accounts for differing orders of minutia in the above example due to inaccuracies in core locating that may occur. If a match is likely, the user is identified or recognized in step 84. If a match is other than likely, then the authorization attempt is rejected and the user is denied access.

Figure 9:
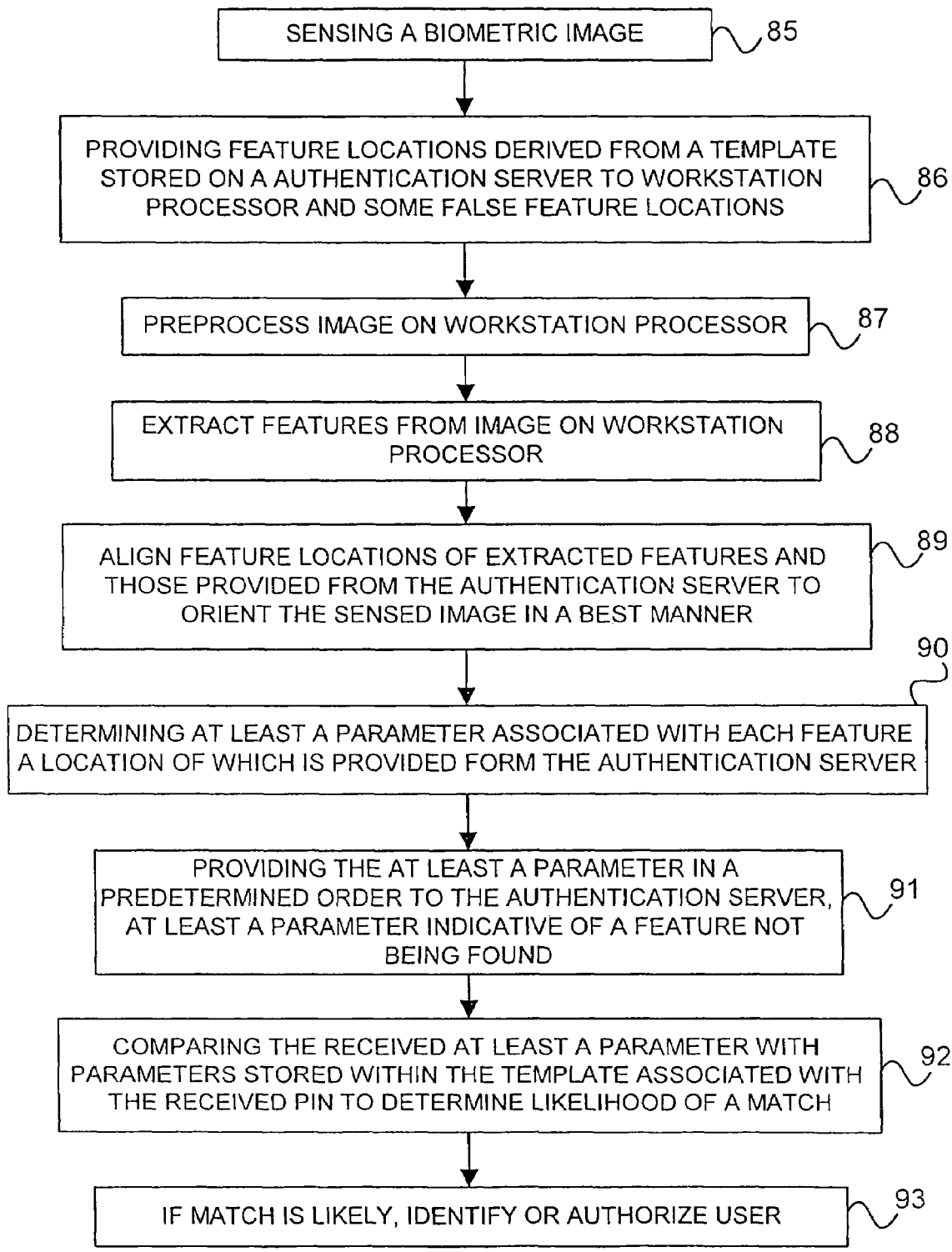
FIG. 9 is a simplified flow diagram of a method of preprocessing a fingerprint image according to another embodiment of the instant invention.

Referring now to FIG. 9, a method of preprocessing a fingerprint image according to the instant invention is shown, wherein biometric data in the form of a public portion of a template is not provided to a preprocessor, for instance a processor of a workstation, from the authentication server. As such, the process is alterable without suffering the drawbacks of the prior art methods.

A fingerprint image of the user is captured using an imaging device of the workstation in step 85. Feature locations derived from a template stored on an authentication server and some false feature locations are provided to the workstation processor in step 86. The image is filtered and the contrast is adjusted to a normalized level in step 87. The fingerprint image is then analyzed by the workstation processor to determine features thereof in step 88. Typically, features of fingerprints include ridge flow angle, minutiae locations, minutiae types, minutiae directions, core location, core orientation, and so forth in step 89. Of course, in order for any of the feature locations to have meaning, they all must be expressed within a global reference frame; this global reference frame includes position and orientation is often related to the core location and orientation.

The method provides for provision of challenge data relating to a template, the data other than image data of a biometric information source. For instance, the authentication server retrieves from memory a stored template, and retrieves a plurality of feature locations from the template. The plurality of locations is of identifiable features, preferably features having accurately identifiable locations. According to the method of FIG. 9, the authentication server further provided at least a false feature location, for instance a location that does not correspond to a location of a minutia point.

A processor of the workstation receiving the challenge and an image of a biometric information source then uses the challenge data to orient the biometric information source relative thereto and in a best manner. This is performed by identifying features within the image, determining feature locations, and then moving the feature locations to overlap the provided locations until a reasonable approximation of image positioning is achieved in step 90.

Once the image positioning is achieved, data relating to a plurality of features within the image are provided to the authentication server in a predetermined order for correlation in step 91. For example, the data relates to minutia locations and directions of the 12 minutiae nearest the first point provided. In addition, the data includes an indication that no feature was extracted at the at least a false feature location. This information is used to verify the accuracy of the information received from the workstation processor.

Thus the processor of the authentication server need only compare a plurality of values to values within the template stored thereon and to expected values for those features that are not present within the fingerprint image in order to form a registration measure for use in user authorization in step 92. Preferably, the comparison is not a fixed comparison to allow for missed minutia or extra minutia within a template. Further preferably, the template accounts for differing orders of minutia in the above example due to inaccuracies in core locating that may occur. If a match is likely, the user is identified or recognized in step 93. If a match is other than likely, then the authorization attempt is rejected and the user is denied access.

Figure 10:
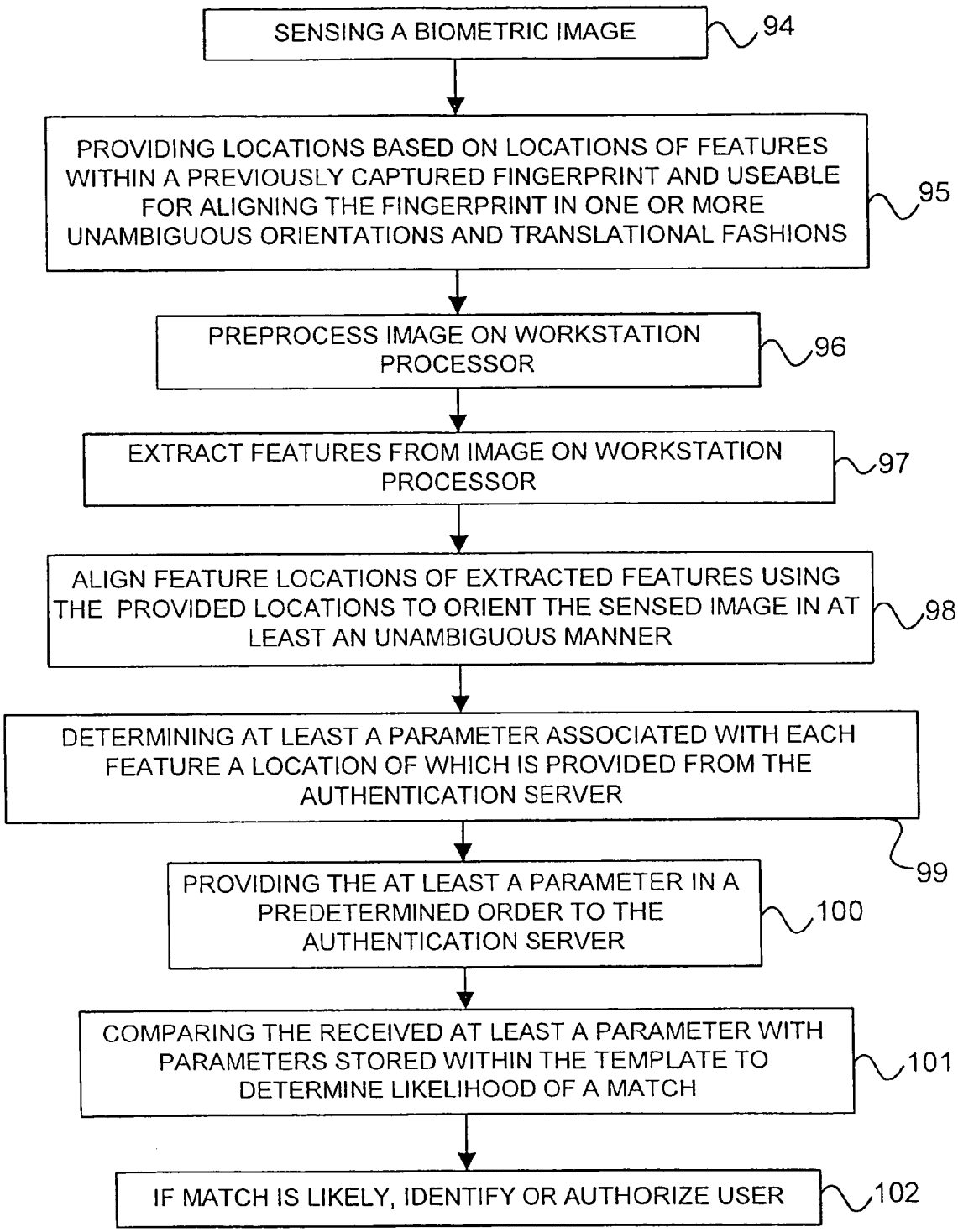
FIG. 10 is a simplified flow diagram of a method of preprocessing a fingerprint image according to another embodiment of the instant invention.

Referring now to FIG. 10, a method of preprocessing a fingerprint image according to the instant invention is shown, absent a step of providing biometric data to a processor of a workstation, from an authentication server.

A fingerprint image of the user is captured using an imaging device of the workstation in step 94. The image is filtered and the contrast is adjusted to a normalized level in step 96. Locations based on locations of features within a previously captured fingerprint and useable for aligning the fingerprint in one or more unambiguous orientations and translational fashions are provided in step 95. The fingerprint image is then analyzed by the workstation processor to determine features thereof in step 97. Typically features of fingerprints include ridge flow angle, minutia locations, minutia types, minutia directions, core location, core orientation, and so forth in step 98. Of course, in order for any of the features to have meaning, they all must be related to a global position; this global position and orientation is often related to the core location and orientation.

Next, the workstation processor receives from the authentication server a plurality of locations relative to feature locations associated with the template to which the fingerprint data is to be registered. Thus, the locations may be 4 pixels to the right and 3 pixels below each feature location. The plurality of locations is a known offset and direction from identifiable features, preferably features having accurately identifiable locations. Of course, the known offset is preferably predetermined though it could also be dynamic in nature requiring synchronization between the authentication server and the workstation or provided from the authentication server to the workstation. The workstation processor uses the extracted feature locations to orient the captured fingerprint image relative to the provided locations. This is performed by identifying features within the image, determining feature locations, and then moving the feature locations to overlap feature locations determined relative to the provided locations until a reasonable approximation of image positioning is achieved in step 99.

Once the image positioning is achieved, data relating to a plurality of features within the image are provided in a predetermined order to the authentication server for correlation in step 100. For example, the data relates to minutia directions and types of features offset from the locations provided.

Thus the processor of the authentication server need only compare a plurality of values to values within a template stored thereon in order to form a registration measure for use in user authorization in step 101. Preferably, the comparison is not a fixed comparison to allow for missed minutiae or extra minutiae within a template. If a match is likely, the user is identified or recognized in step 102. If a match is other than likely, then the authorization attempt is rejected and the user is denied access.

Advantageously, such a method permits different offsets to be applied to different provided feature locations thereby obfuscating any feature related data that may be determined from the data provided.

Figure 11:
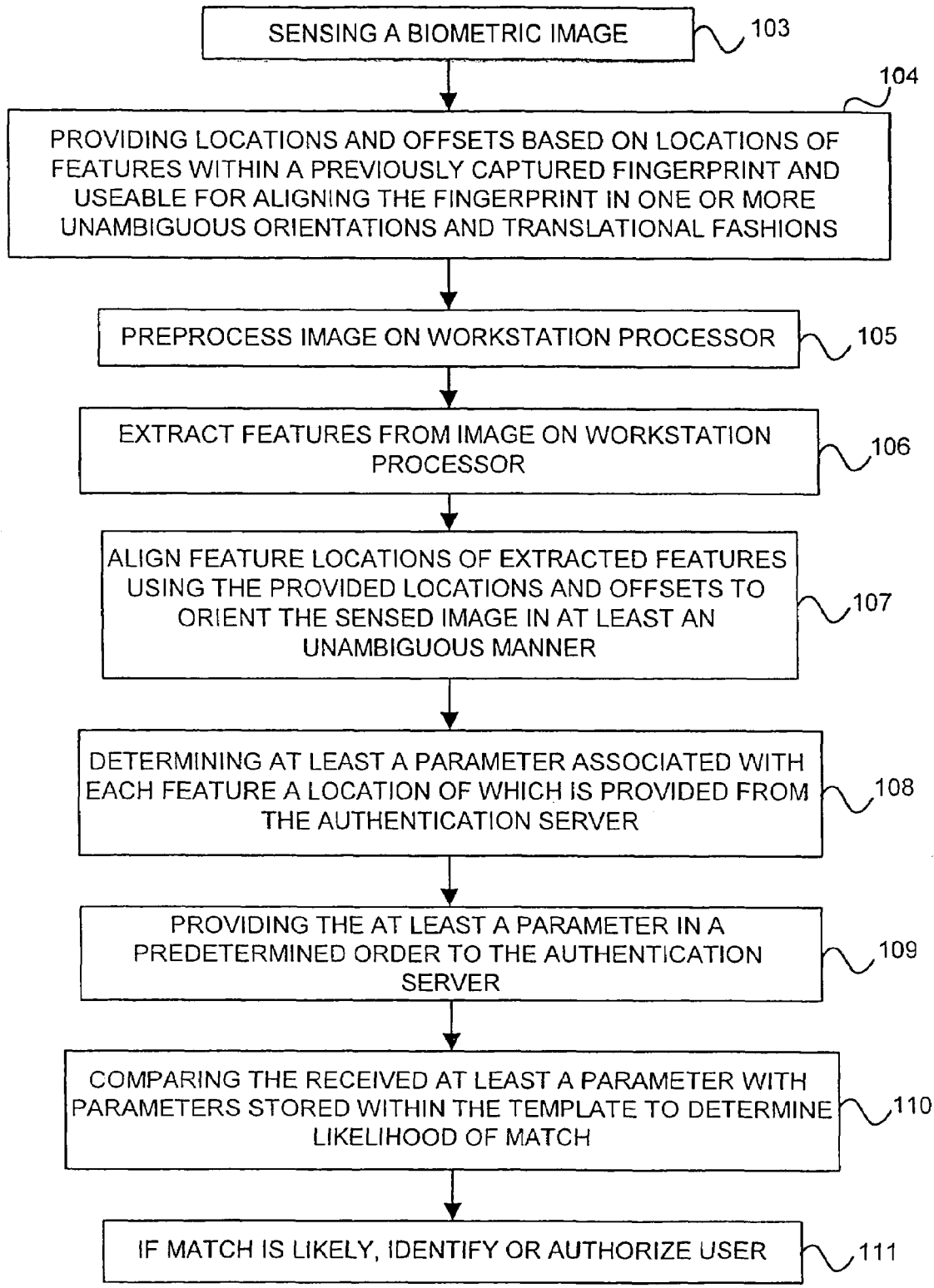
FIG. 11 is a simplified flow diagram of a method of preprocessing a fingerprint image according to another embodiment of the instant invention; and, FIG. 12 is a simplified flow diagram of a method of preprocessing a fingerprint image according to another embodiment of the instant invention.

Referring now to FIG. 11, a method of preprocessing a fingerprint image according to the instant invention is shown, absent a step of providing biometric data to a processor of a workstation, from an authentication server.

A fingerprint image of the user is captured using an imaging device of the workstation in step 103. Locations and offsets based on locations of features within a previously captured fingerprint and useable for aligning the fingerprint in one or more unambiguous orientations and translational fashions are provided in step 104. The image is filtered and the contrast is adjusted to a normalized level in step 105. The fingerprint image is then analyzed by the workstation processor to determine features thereof in step 106. Typically features of fingerprints include ridge flow angle, minutia locations, minutia types, minutia directions, core location, core orientation, and so forth. Of course, in order for any of the features to have meaning, they all must be related to a global position; this global position and orientation is often related to the core location and orientation.

Next, the workstation processor receives from the authentication server a plurality of locations relative to feature locations associated with the template to which the fingerprint data is to be registered. Thus, the locations may be 4 pixels away from each feature location. The plurality of locations is a known offset from identifiable features, preferably features having accurately identifiable locations. Of course, the known offset is preferably predetermined though it could also be dynamic in nature requiring synchronization between the authentication server and the workstation or provided from the authentication server to the workstation in step 107. The workstation processor uses the extracted feature locations and directions to orient the captured fingerprint image relative to the provided locations. This is performed by identifying features within the image, determining feature locations and orientations, and then determining an image orientation such that the points the known offset from the features along the feature direction overlap the locations provided in step 108.

Of course, other data extractable from the features is also useful in determining the direction. Alternatively, the direction is known but the feature angle or type is used to determine an offset to the provided location.

Once the image positioning is achieved, data relating to a plurality of features within the image are provided in a predetermined order to the authentication server for correlation in step 109. For example, the data relates to minutia directions and types of features offset from the locations provided.

Thus the processor of the authentication server need only compare a plurality of values to values within a template stored thereon in order to form a registration measure for use in user authorization in step 110. Preferably, the comparison is not a fixed comparison to allow for missed minutia or extra minutia within a template. If a match is likely, the user is identified or recognized in step 111. If a match is other than likely, then the authorization attempt is rejected and the user is denied access.

In accordance with yet another embodiment of the invention there is provided a method wherein locations relating to feature locations but not providing any useful information relating to the biometric image is proposed. Here, similar to the method of FIG. 11, instead of feature locations, locations determinable from features and their locations are provided. However, unlike the method of FIG. 10, here the offset of the feature locations are determined and applied on the authentication server. This eliminates drawbacks of the method of FIG. 10. For example, if two different radii were used with a same individual, the fact that the two resulting circles, when plotted, have two intersections, limits feature locations to two locations. As such, instead of a feature lying on a circle, it is now within one of two points. A third radius would likely result in knowledge of the feature location.

Figure 12:
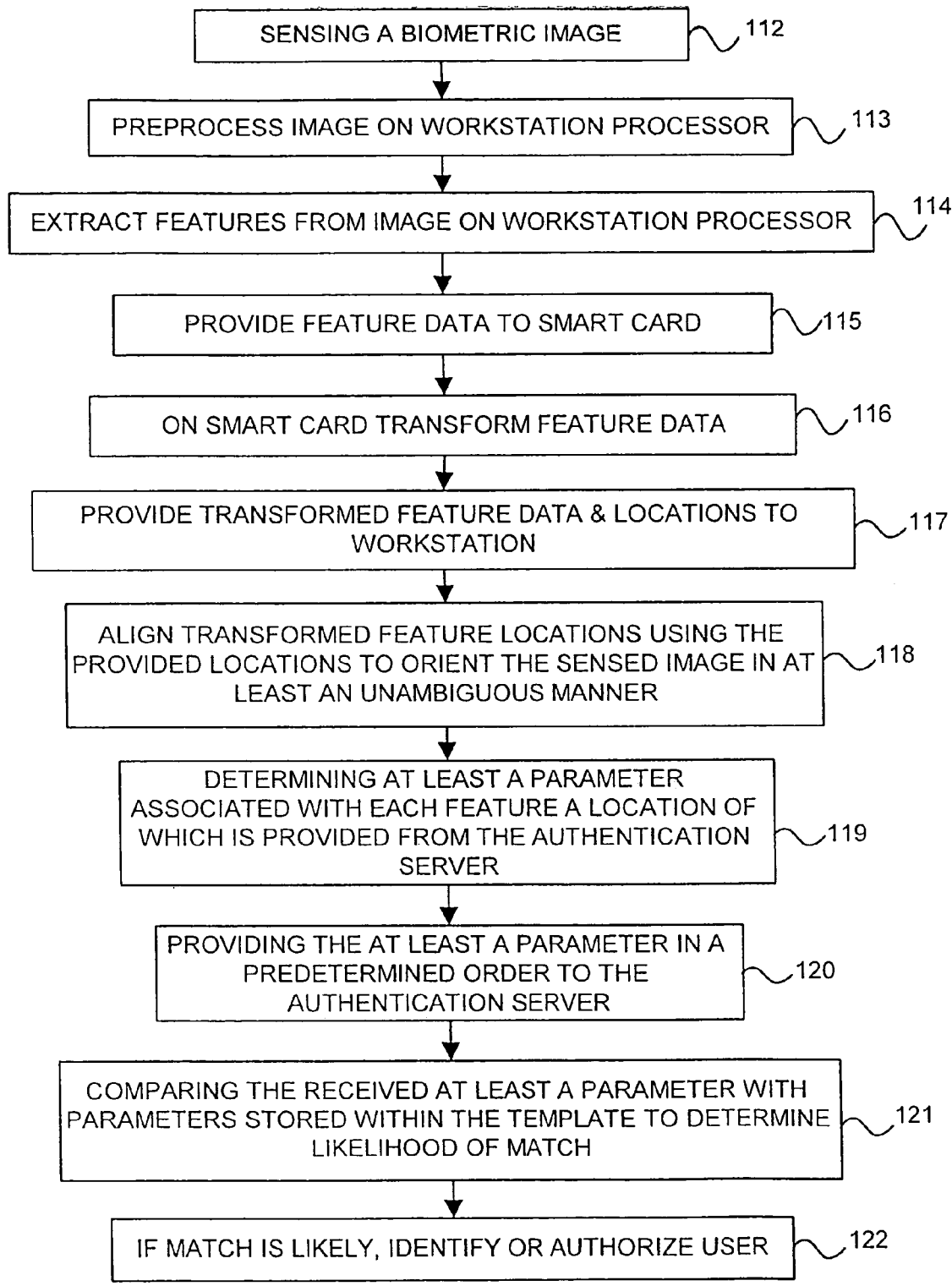

Referring now to FIG. 12, a method of preprocessing a fingerprint image according to the instant invention is shown, absent a step of providing biometric data to a processor of a workstation, from the authentication server.

A fingerprint image of the user is captured using an imaging device of the workstation in step 112. The image is filtered and the contrast is adjusted to a normalized level in step 113. The workstation processor then analyzes the fingerprint image to determine features thereof in step 114. Typically features of fingerprints include ridge flow angle, minutia locations, minutia types, minutia directions, core location, core orientation, and so forth. Of course, in order for any of the features to have meaning, they all must be related to a global position; this global position and orientation is often related to the core location and orientation.

Next, the workstation processor provides to the authentication server data relating to the extracted features in step 115. For example, feature location and directions are provided. The authentication server applies a transform to each feature location in step 116. Since the direction of each feature is provided, the authentication server can use this information in applying the transform. As such, application of radius and angle offsets to each feature location is possible with a reasonable amount of computation. The transformed feature locations are returned to the workstation processor in step 117 along with a plurality of alignment locations in step 118. Of course, changing radii or angle or feature quality on which these are based is now possible without divulging information on the feature locations of features within the template in step 119. Further, the alignment problem for the workstation processor is a straightforward alignment process since the feature locations and the alignment locations are known at the outset and need not be re-determined for different potential alignments as is the case for the method of FIG. 11.

Thus, the transformed feature locations may be 4 pixels away from each feature location and the alignment locations are similarly 4 pixels from each feature location. Once the image positioning is achieved, data relating to a plurality of features within the image are provided in a predetermined order to the authentication server for correlation in step 120. For example, the data relates to minutia directions and types of features offset from the locations provided.

Thus the processor of the authentication server need only perform a simple transform for each feature location received and compare a plurality of values to values within a template stored thereon in order to form a registration measure for use in user authorization in step 121. Preferably, the comparison is not a fixed comparison to allow for missed minutia or extra minutia within a template. If a match is likely, the user is identified or recognized in step 122. If a match is other than likely, then the authorization attempt is rejected and the user is denied access.

Advantageously, such a method permits different offsets and/or directions to be applied to different features based on the features themselves in performing image alignment. This obfuscates any feature related data that may be determined from the data provided. This also makes alignment of the image data very difficult absent knowledge of the process and the image contents.

Alternatively, with the alignment data is provided a frame within which to provide image data or data relating to features therein. For example, 12 minutiae locations are provided. Once the image is aligned to the minutiae locations, a sub-image within a provided frame is analyzed for features and their types and orientations—angles. Thus, only a portion of the image is used for each correlation. Advantageously, the portion used for correlation can be arbitrarily moved between correlation processes to prevent record playback attacks and to prevent interception of useful image related feature data.

Similarly, the location data is movable. For example, within a template twelve feature locations are stored for each of 20 different rotations of the image. The results for those feature locations are also stored for each of the 20 different orientations. Thus, each time a same individual attempts to gain access, a different set of locations is provided and a different result is expected. Of course, selection from any number of available features further complicates the reverse engineering and/or hacking of such a system. Optionally, instead of storing each permutation on the authentication server with the template, they are calculated in parallel to the workstation processor determining the values based on the acquired image. Thus, the authentication server processing is no longer a bottleneck within the critical path of a multitude of simultaneous authentication processes, and can now support any number of rotational angles and translations for any number of features.

Alternatively, the authentication server provides a public portion of a fingerprint image or of the biometric data to the workstation to permit preprocessing thereby. For example, the authentication server provides to the workstation to image areas from within the image of the biometric information source for use in aligning a sensed image with the template. Further alternatively, an image of the biometric information source is provided absent a section thereof. In such a case, the returned data from the workstation preferably relates to the absent section. As such, in an embodiment the invention relates to providing data relating to the image of the biometric information source and allowing alignment thereof by a processor of the workstation.

Numerous other embodiments may be envisaged without departing from the spirit and scope of the invention.

What is claimed is:

1. An authentication server comprising a memory for storing a biometric template for comparison with minutia types and minutia angles from a biometric sample for identity check, wherein the biometric template is divided into a private portion which is adapted to be exclusively used in the authentication server, and a public portion which is adapted to be transferred to and processed in a workstation processor, said public portion including alignment data having co-ordinates that are selected for alignment of said minutia types and minutia angles of said biometric sample but are also selected such that there is insufficient information to accurately identify features of the biometric template.

2. An authentication server according to claim 1, wherein the private portion of the biometric template comprises at least one partial area, which constitutes a private partial area, of a digital image of an individual-specific parameter.

3. An authentication server according to claim 2, wherein the individual-specific parameter is a fingerprint.

4. An authentication server according to claim 3, wherein the public portion of the biometric template comprises information which is intended to be used for determining a reference point in the biometric sample, which reference point corresponds to a reference point in the biometric template.

5. An authentication server according to claim 4, wherein the public portion of the biometric template comprises information which is intended to be used for determining how the template is oriented in relation to the biometric sample.

6. An authentication server according to claim 2, wherein the public portion of the biometric template comprises at least one partial area, which constitutes a public partial area, of a digital image of an individual-specific parameter.

7. An authentication server according to claim 6 wherein the number of private partial areas is greater than the number of public partial areas.

8. An authentication server according to claim 6 wherein at least one private partial area is located in immediate connection with a public partial area in the digital representation.

9. An authentication server according to claim 4 wherein the public portion of the biometric template comprises information about the mutual positioning of a plurality of features of a predetermined type in the digital image of the individual-specific parameter.

10. An authentication server according to claim 4 wherein the public portion of the biometric template comprises information about how said at least one private partial area is located in relation to said reference point.

11. An authentication server according to claim 1, wherein the private portion of the template comprises at least one threshold value which indicates to what extent said at least one private partial area is to match a corresponding partial area of the biometric sample for these two areas to be considered to originate from the same individual.

12. A system for authenticating an individual using a biometric sample from the individual, comprising:

a processor;

an authentication server comprising a memory that stores a biometric template for comparison with a biometric sample from the individual for identity check, wherein the biometric template is divided into a private portion which is adapted to be exclusively used in the authentication server, and a public portion which is adapted to be transferred to and processed in said processor, said public portion including alignment data having co-ordinates that are selected for alignment of minutia types and minutia angles of said biometric sample but are also selected such that there is insufficient information to accurately identify features of the biometric template; and a biometric imaging station comprising a biometric sensor for sensing an image of said biometric sample from the individual to provide minutia types and minutia angles of said sensed biometric image data, a transceiver for transmitting data to the authentication server and for receiving data provided from the authentication server, and a memory for storing data.

13. A system according to claim 12, wherein the biometric imaging station further comprises a processor programmed to perform a method comprising:

receiving said alignment data including co-ordinates from the authentication server, the alignment data for use by the processor in aligning the sensed biometric image data within a known frame of reference;

aligning the sensed biometric image data within the known frame of reference;

determining from the aligned biometric image data extracted biometric data; and providing the extracted biometric data based on the aligned biometric image data within the known frame of reference to the authentication server.

14. A system according to claim 12, wherein the public portion of the biometric template comprises information which is intended to be used by said processor for determining a reference point in the biometric sample, which reference point corresponds to a reference point in the biometric template.

15. A system according to claim 14, wherein the public portion of the biometric template comprises information which is intended to be used by said processor for determining how the template is oriented in relation to the biometric sample.

16. A system according to claim 12, wherein the public portion of the biometric template comprises at least one partial area, which constitutes a public partial area, of a digital image of an individual-specific parameter.

17. A system for authenticating an individual, comprising:

an authentication server comprising means for storing a biometric template for comparison with minutia types and minutia angles of a biometric sample for identity check, wherein the biometric template is divided into a private portion which is adapted to be exclusively used in the authentication server, and a public portion including alignment data having co-ordinates that are selected for alignment of minutia types and minutia angles of said biometric sample but are also selected such that there is insufficient information to accurately identify features of the biometric template; and means for processing said public portion.

18. A system according to claim 17, wherein the public portion of the biometric template comprises information which is intended to be used by said processing means for determining a reference point in the biometric sample, which reference point corresponds to a reference point in the biometric template.

19. A system according to claim 18, wherein the public portion of the biometric template comprises information which is intended to be used by said processing means for determining how the template is oriented in relation to the biometric sample.

20. A system according to claim 17, wherein the public portion of the biometric template comprises at least one partial area, which constitutes a public partial area, of a digital image of an individual-specific parameter.

* * * * *